June 18, 1946.    E. E. BISSETT    2,402,311
AIRPLANE
Filed Sept. 17, 1943    3 Sheets-Sheet 1

INVENTOR
ERNEST E BISSETT
Ernest E Carver
ATTORNEY

June 18, 1946.  E. E. BISSETT  2,402,311
AIRPLANE
Filed Sept. 17, 1943  3 Sheets-Sheet 2

INVENTOR
ERNEST E. BISSETT
Ernest E. Carver
ATTORNEY.

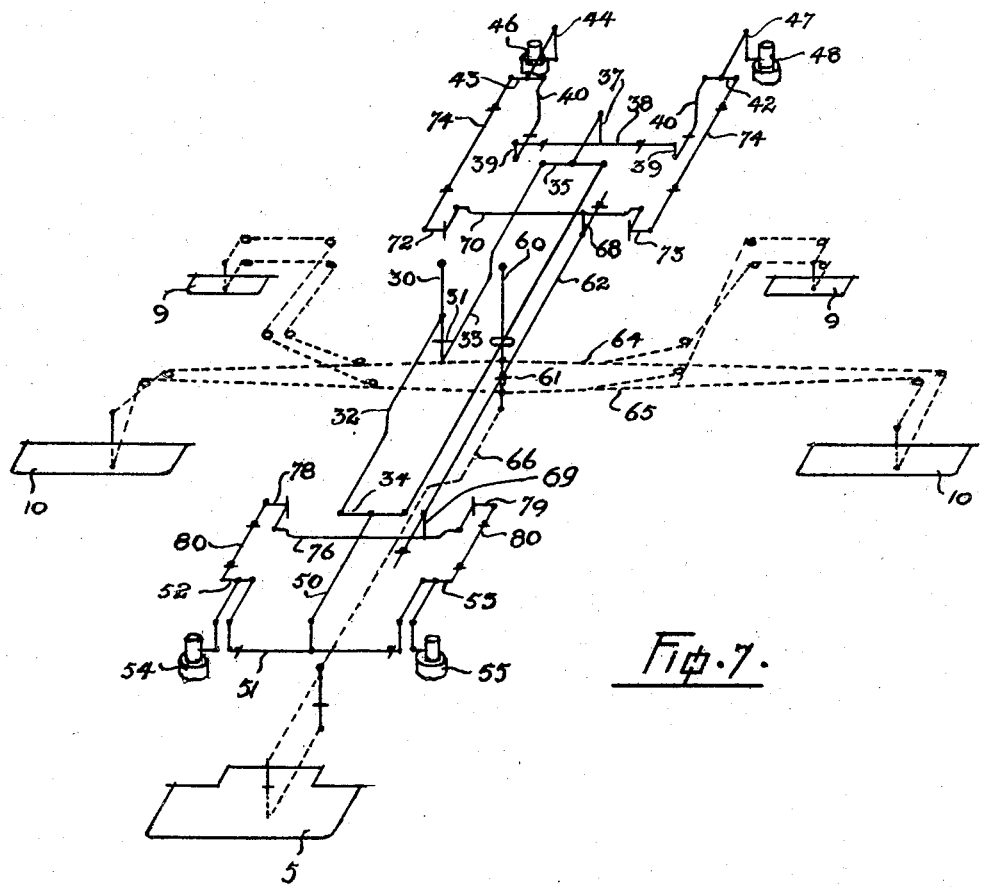

Patented June 18, 1946

2,402,311

UNITED STATES PATENT OFFICE 2,402,311

AIRPLANE

Ernest E. Bissett, Vancouver, British Columbia, Canada

Application September 17, 1943, Serial No. 502,748

6 Claims. (Cl. 244—13)

My invention relates to improvements in airplanes, the objects of which are to provide means for utilizing the slip streams from the air screws to increase the lift on wing and other lifting surfaces when the plane is travelling at slow or landing speeds, and to provide means for varying the relative position of centre of lift or pressure, so that main wings can be utilized to check speed and maintain stability. Other objects will appear as the specification proceeds.

The invention contemplates a plane having a main wing from the trailing edge of which is carried an air screw, the trailing edge of said wing adjacent the air screw being transversely curved in the direction of the slip stream of said air screws, as will be more fully described in the following specification and shown in the accompanying drawings, in which:

Fig. 7 is a diagram of a control system for the motors, ailerons and elevator of the plane looking from rear to forward.

In the drawings like characters of reference indicate corresponding parts in each figure.

Figure 1:
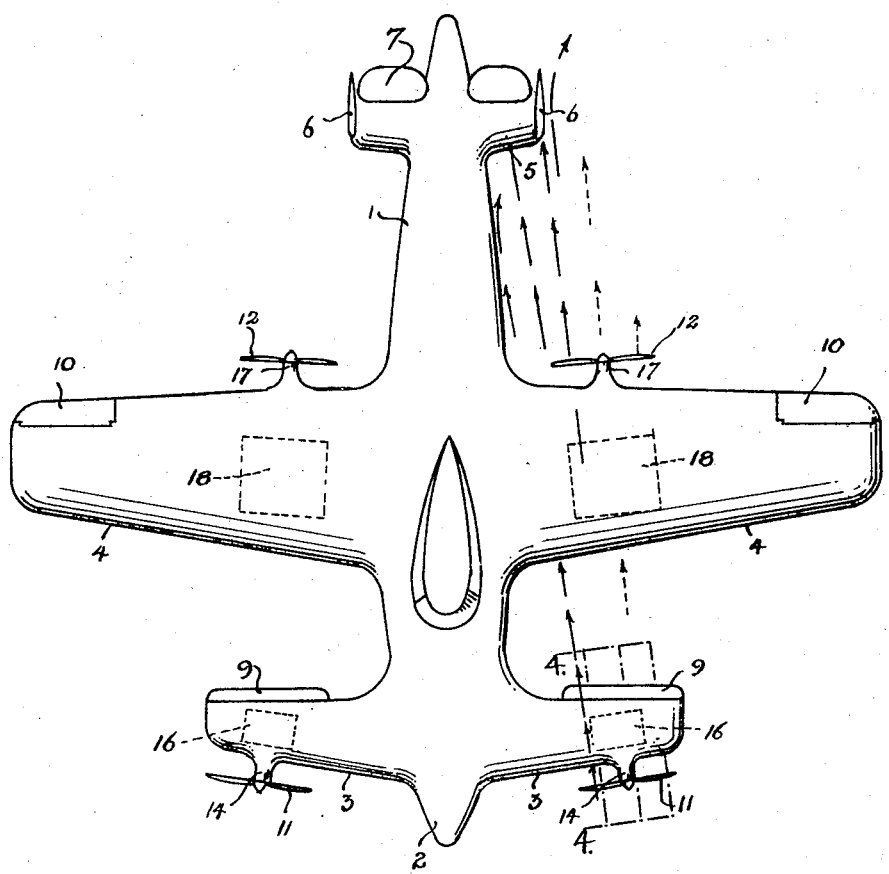
Fig. 1 is a plan view of the preferred form of the invention.

The numeral 1 indicates generally a fuselage having a nose 2, right and left climbing wings 3, right and left main wings 4, a stabilizer 5, vertical rudders 6 and elevators 7. The climbing and main wings are respectively provided with ailerons 9 and 10 and also house engines, not shown, to drive air screws 11 and 12.

Figure 2:
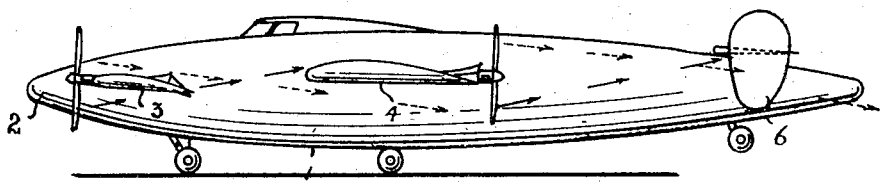
Fig. 2 is a side elevational view.
Figure 3:
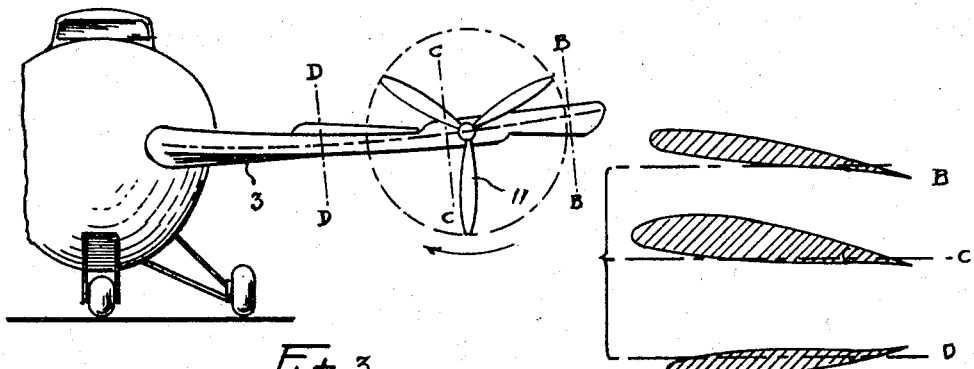
Fig. 3 is a front view of a forward or climbing wing.
Figure 4:
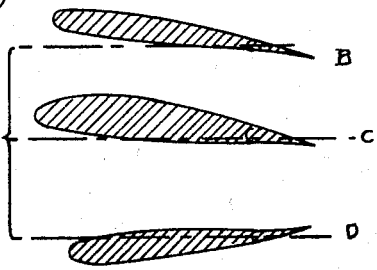
Fig. 4 is a plurality of profiles taken on the lines B, C and D of Figure 3.

The air screws 11 are of the tractor type fitted on shafts 14 extending from a nacelle 16 in the leading edge of the climbing wing and the air screws 12 are of the propulsion type and are each fitted on an engine shaft 17 extending from a nacelle 18 in a main wing and through the trailing edge of said wing. The axes of the air screw shafts on the right climbing and main wings and the axes of the corresponding shafts on the left wings converge aft as shown, so that when said screws are rotating at relatively low power, such as when about to land, that portion of the slip stream which is rising spirally from beneath the wings will exert a positive lifting force on the wing surfaces between the axes of the screw shafts and the fuselage and also on the underside of the stabilizer surfaces. The rear or trailing edge of the climbing wings 3 are distorted as shown in the diagrams B, C and D of Figure 4. Taking for instance the left climbing wing 3, see Figure 3, with its air screw turning in a clockwise direction as shown, the trailing edge of the section B or the aileron 9 which is adjacent the tip of the wing is depressed as the slip stream is driving rearwardly and downwardly so as to exert similar lift upon the upper and lower wing and aileron surfaces, which would normally apply to a wing portion extending beyond the reach of any slip stream from an air screw, in other words the angle of attack of the wing at this point is above the normal angle of attack of the wing, the reference line in each of these sections is shown in chain dotted line. The diagram C, which is taken substantially along the axis of the screw shaft shows the thickening of the wing necessary to provide an engine nacelle, in this case the wing and, or the aileron, are formed to provide an angle of attack similar to the normal angle of attack of the main wings. At this point the slip stream from the air screw is not effecting either the positive or negative lift or pressure on the wing surface materially. The diagram D is taken of a section of the wing close to the fuselage where the slip stream from the screw is spirally upwardly and rearwardly, imposing a definite positive lift to the wing which overcomes the negative angle of attack from relative wind of this portion of said wing and at the same time gives a definite sustained lift on these wing and aileron surfaces substantially forward of the centre of gravity which is not available with the ordinary type of wing. The main wings are distorted along their trailing edges for a length substantially similar to the diameter of its air screw as shown in dotted line in Figure 5, to receive some of the spirally induced slip stream from the air screws 12. The slip stream from the air screws 12 also produce an upwardly and laterally inclined lift to the rear surfaces of the fuselage and underside of the stabilizer and elevator as indicated by arrows shown in solid line in Figures 1, 2 and 5, thereby creating definite longitudinal stability and restoring turning moment.

In order that the position of lift may be definitely controlled I provide means for controlling the motors of all the air screws and the ailerons simultaneously. The means here shown are intended to indicate the sequence of movement of the throttles and ailerons rather than the mechanism which obviously may be mechanical, hydraulic, electrical or otherwise as desired.

The numeral 30 indicates a carburetor control lever which is fulcrumed as at 31 above and below the fulcrum push rods respectively numbered 32 and 33 and extend to an outer end of yokes 34 and 35. The centre of the yoke 35 is connected to a vertical arm 37 mounted upon a rock shaft 38 which is fitted at its ends with two cranks 39 connected through push rods 40 to the inner ends of two small yokes 42 and 43. The centre of the yoke 43 is connected to the lever 44 of a carburetor 46 supplying fuel to the motor of the left climbing wing 3, and the centre of the yoke 42 is connected to the lever 47 of a carburetor 48 supplying fuel to the motor of the right climbing wing 3. The centre of the yoke 34 is connected in a similar manner through a rod 50, a rock shaft 51 and small yokes 52 and 53 to carburetors 54 and 55 respectively, which control the motors of the left and right main wings respectively.

The numeral 60 indicates a main control lever for use in controlling the speed of the several motors when operating at substantially landing speed. This lever is fulcrumed for selectively controlling fore and aft movement upon a pin 61 which passes through a longitudinal rock shaft 62. Flexible connections 64 and 65, shown in dotted line, extend transversely from above and below the fulcrum pin 61 to the ailerons 9 and 10 to operate them in the usual way by transverse movement of the lever and a push rod connection 66 extends from the lower end of the lever 60 to operate the elevator as said lever is moved in a fore and aft direction.

Adjacent the forward end of the rock shaft 62 is an upwardly extending arm 68 and adjacent the rear end of said shaft is a downwardly extending arm 69. The upwardly extending arm 68 connects through a transverse push rod 70 with the inner legs of two bell cranks respectively numbered 72 and 73 and through longitudinally disposed push rods 74 to the outer ends of the small yokes 42 and 43 respectively, so that when the arm 68 is swung to the right of Figure 7, incidental to similar movement of the top of the lever 60 the left hand rod 74 will move forwardly to open the throttle of carburetor 46 wider, and the right hand rod 74 will move the rear, rocking the small yoke 42 and causing the throttle of the carburetor 48 to closing position, thus decreasing the power of the motor to the right climbing wing. The downwardly extending arm 69 connects through a transverse rod 76 with the inner legs of two bell cranks respectively numbered 78 and 75, the outer legs of said bell cranks connecting through longitudinally disposed push rods 80 to the small yokes 52 and 53 respectively, so that when the downward arm 69 swings to the left of Figure 7, the push rod 80 to the yoke 52 moves forwardly to open the carburetor 54 and the push rod 80 to the right of the engine moves rearwardly, thus rocking the yoke 53 to close down the carburetor and decrease the power of the motor of the right main wing.

A stick would be provided for operating the ailerons and elevators alone when in normal flight, leaving the main control lever 60 at rest, but as this forms no part of the invention no description is given.

Figure 6:
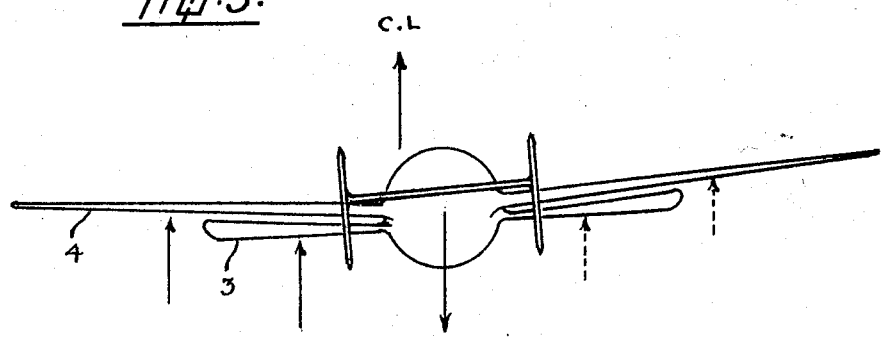
Fig. 6 is a rear view showing the resultant centre of lift of the plane as developed by the invention as the plane is being restored to normal flight position.

In operating the airplane when making a landing, the throttle control lever 30 is pulled back, operating the push rods 32 and 33 which through their connecting train of parts close down all the carburetors to an appropriate position, the lever is then left at rest with the push rods 32 and 33 at rest also, if the left wings 3 and 4 should drop through air disturbances or other causes as shown in Figure 6, the main control lever 60 is moved to the right as in Figure 7, depressing the ailerons on the left climbing and main wings to raise that side of the plane.

Simultaneously with the setting of the ailerons as above described the longitudinal rock shaft 62 would be rocked in a clockwise direction, causing the push rods 74 and 80 on the left of Figure 7 to move forwardly and open up the carburetors 46 and 54 while the push rods 74 and 80 on the right side of the figure will move rearwardly, closing down the carburetors 48 and 55. The resultant change of power of the motors on opposite sides of the plane with the resultant increasing and decreasing of slip stream effort on airfoil surfaces will greatly increase the lift on one side and decrease it on the other, thereby setting up a restoring or righting moment to set the plane on even keel. As the left motor effort has been increased over that of the right, the plane will have a tendency to turn to the right. However, due to the axes of the air screws converging towards the tail surfaces the resultant increased slip stream striking the left side of the fuselage, fin and rudder surfaces would set up a counter turning moment to the left, thereby restoring the plane to its original path of flight.

Figure 5:
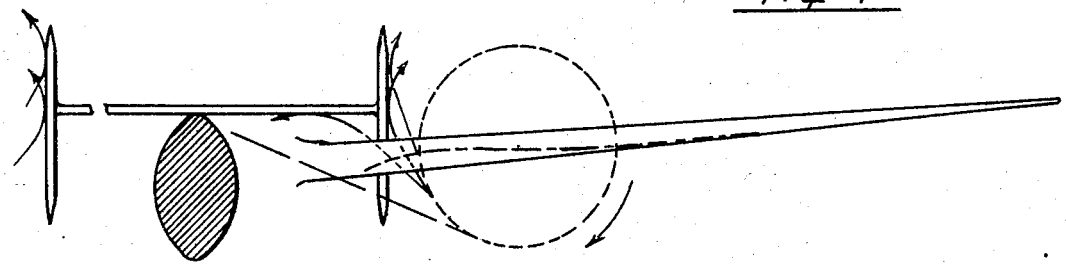
Fig. 5 is a front view of a main wing showing rudder and stabilizer surfaces as effected by slip stream.

Obviously when in normal flight the length of each convolution of the spiral slip stream will be long and have lifting force on the wings and stabilizer surfaces only, but when travelling at landing or very slow speeds each convolution of the spiral slip stream will be relatively short and together with its high velocity the resultant positive up lift of that portion of the slip stream which strikes under surfaces and vertical surfaces, as indicated by solid lines in Figure 5, will be materially greater than the normal lifting effort of the relative wind on air foils at slow or landing speeds.

The ability to regulate the air screw effort on one side of the plane or the other, together with the controlling movement of the ailerons and elevator, either jointly or separately, permits the pilot to change the position of the centre of lift as he desires about the centre of gravity of the plane to maintain lateral stability.

If the lever 60 is moved in a rearward direction without transverse movement, the climbing wing motors are increased in power and the main wing motors are decreased in power. The climbing wings by virtue of increased lift, resulting from the curvature of their trailing edges or ailerons to conform substantially to the pitch of the slip stream leaving the air screws and the resulting increased lift due to said curvature, will cause the nose to lift and the slackening of speed of the main wing motors will allow the tail of the plane to descend. The centre of lift in this case is changed longitudinally from the centre of gravity to a forward direction according to the extent of the lever movement. If the lever is moved forwardly the climbing wing motors decrease in power, reducing the lift on these wings, and the main wing motors are increased in power, increasing the lift on the main wings and on the stabilizer, elevator, rudder and rear fuselage surfaces, the tail will be raised.

The effect obtainable by use of the main control lever 60 being as follows: On moving the lever transversely from vertical position to the left of the direction of flight, the centre of lift, indicated by C. L. is moved to the right of the centre of gravity or C. G. On moving the lever transversely to the right the C. L. is moved to the left of C. G. On moving the lever forwardly the C. L. is moved to the rear of C. G. and on moving the lever rearwardly the C. L. is moved forwardly of C. G.

In normal flight the power obtained from the air screws is sufficient to maintain the plane in stability and the convolutions of the slip streams from said screws are so long that the rear of the fuselage and tail parts are not appreciably effected thereby.

In the invention as herein before described, the air screws of the climbing wings 3 are adapted to rotate in the same direction of the air screws of the corresponding main wings, but it will be apparent to the aeronautical engineer that substantially similar effects may be obtained by reversing the direction of the air screws 11 of the climbing wings 3 and reversing the curvature or distortion of the trailing edge of said climbing wings. Assuming this to be done, the trailing edge of the wing or aileron adjacent the tip of the wing would be raised, as in section D of Figure 4, and the slipstream from both climbing wing air screws would be giving a positive lift to those portions of the climbing and main wings as are between the axes of the air screws 11 and the free ends or tips of the wings.

What I claim as my invention is:

1. In an airplane having a fuselage, a pair of climbing wings, a pair of main wings and a stabilizing surface adjacent the rear of the fuselage, a power driven air screw intermediate the length of each wing, one pair of said wings having ailerons disposed within the path of the slip stream of its air screws, each of said ailerons being distorted fore and aft to conform substantially to the pitch of the slip stream of the air screw aligned with said aileron when said air screw is rotating to deliver a predetermined power.

2. In an airplane having a fuselage, a pair of climbing wings, a pair of main wings and a stabilizing surface adjacent the rear of the fuselage, a power driven air screw intermediate the length of each wing, one pair of said wings having ailerons disposed within the path of the slip stream of its air screws, each of said ailerons being distorted fore and aft to conform substantially to the pitch of the slip stream of the air screw aligned with said aileron when its air is rotating at substantially landing power.

3. In an airplane having a fuselage, a pair of climbing wings, a pair of main wings and a stabilizing surface adjacent the rear of the fuselage, each of said wings having a power driven air screw intermediate its length, each of said climbing wings having an aileron disposed in the path of the slip stream of its air screw, said aileron being distorted fore and aft to conform substantially to the pitch of the slip stream of its air screw when said air screw is rotating to deliver a predetermined power.

4. In an airplane having a fuselage, a pair of climbing wings, a pair of main wings and a stabilizing surface adjacent the rear of the fuselage, each of said wings having a power driven air screw intermediate its length, each of said climbing wings having an aileron disposed in the path of the slip stream of its air screw, said aileron being distorted fore and aft to conform substantially to the pitch of its air screw when said air screw is rotating at a predetermined power, and each of said main wings having a zone within the slip stream of one of the air screws which is distorted to conform to the pitch of the slip stream of said air screw when said air screw is rotating to deliver a predetermined power.

5. In an airplane having a fuselage, two pairs of wings mounted in tandem on the fuselage, stabilizing surfaces adjacent the rear of the fuselage, an aileron mounted upon each of one pair of wings, a power driven air screw for each of said wings, a source of power for each of said air screws, manually operable means connected to each source of power and each aileron for selectively increasing the power of some of the air screws and decreasing the power of the remaining air screws and for simultaneously elevating one aileron and depressing the other aileron.

6. In an airplane having a fuselage, two pairs of wings mounted in tandem on the fuselage, stabilizing surfaces adjacent the rear of the fuselage, an aileron mounted upon each of one pair of wings, a power driven air screw for each of said wings, a source of power for each of said air screws, manually operable means connected to each source of power and each aileron for selectively increasing the power of the air screws on one side of the fuselage and decreasing the power of the air screws on the opposite side of the fuselage and for simultaneously elevating one aileron and depressing another.

ERNEST E. BISSETT.